United States Patent [19]

Suzuki

[11] Patent Number: 6,026,278
[45] Date of Patent: Feb. 15, 2000

[54] RADIO RECEIVER HAVING TEMPERATURE COMPENSATED VOLTAGE CONTROLLED CRYSTAL OSCILLATOR

[75] Inventor: Masaki Suzuki, Shizuoka, Japan

[73] Assignee: NEC Corporation, Tokyo, Japan

[21] Appl. No.: 08/969,463

[22] Filed: Nov. 13, 1997

[30] Foreign Application Priority Data

Nov. 14, 1996 [JP] Japan ................................ 8-302773

[51] Int. Cl.[7] .................................................. H04B 7/00
[52] U.S. Cl. ..................... 455/38.3; 455/343; 455/191.1; 375/327
[58] Field of Search ............................. 455/191.1, 192.2, 455/255, 257, 260, 264, 265, 343, 38.3, 182.1, 182.3, 191.3, 502, 192.1; 375/327, 344

[56] References Cited

U.S. PATENT DOCUMENTS

| | | | |
|---|---|---|---|
| 4,348,772 | 9/1982 | Leland et al. ........................ | 455/260 |
| 5,440,298 | 8/1995 | Kuramatsu ............................ | 455/38.3 |
| 5,548,823 | 8/1996 | Hirasawa et al. ..................... | 455/343 |
| 5,606,739 | 2/1997 | Goto ..................................... | 455/38.3 |
| 5,613,235 | 3/1997 | Kivari et al. ......................... | 455/38.3 |
| 5,706,315 | 1/1998 | Ogoro .................................. | 455/192.2 |
| 5,734,686 | 3/1998 | Kuramatsu ........................... | 455/38.3 |

FOREIGN PATENT DOCUMENTS 2-39617 2/1990 Japan .
2-218231 8/1990 Japan .
7-235957 9/1995 Japan .
8-242145 9/1996 Japan .

OTHER PUBLICATIONS

Japanese Office Action dated Jan. 19, Hei 11 with English language translation of Japanese Examiner's comments.

Primary Examiner—Reinhard J. Eisenzopf
Assistant Examiner—Greta J. Fuller
Attorney, Agent, or Firm—Whitham, Curtis & Whitham

[57] ABSTRACT

In a radio receiver, a voltage-controlled crystal oscillator of a radio frequency section produces a local carrier for mixing it with a received radio signal to produce an analog output signal. A threshold decision circuit comprising an average circuit and a comparator compares this output signal with a decision threshold and produces a digital signal. A synchronization detector produces an in-sync signal when a synchronization bit pattern is present in the digital signal. Otherwise, it produces an out-of-sync signal. The radio-frequency section is periodically activated and deactivated by power saving pulses. Frequency control circuitry varies a control voltage applied to the voltage-controlled crystal oscillator by a predetermined amount if a predetermined number of the power saving pulses is produced after the instant the out-of-sync signal is produced. The control voltage will be varied if the same number of power saving pulses is produced again in the presence of the out-of-sync signal after the control voltage was varied previously. The control voltage is maintained at a level which is obtained at the instant the in-sync signal is produced.

16 Claims, 3 Drawing Sheets

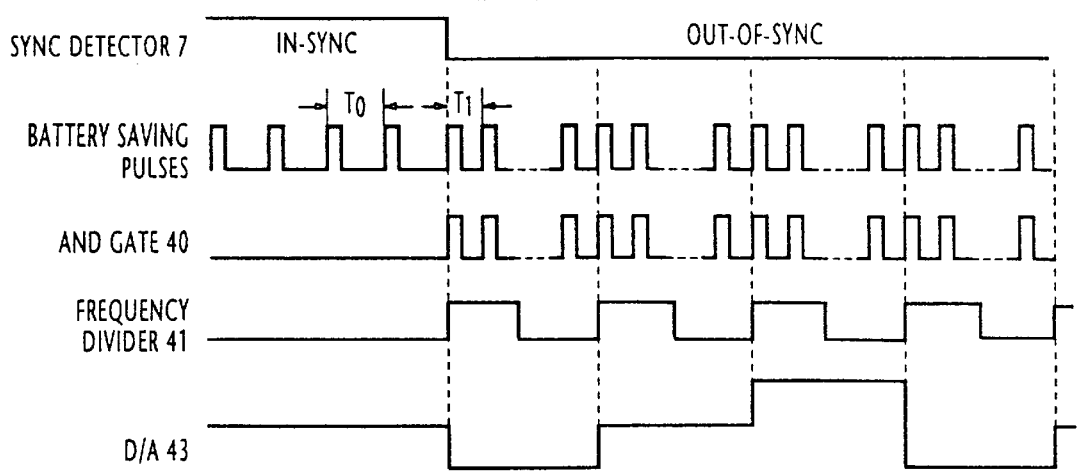
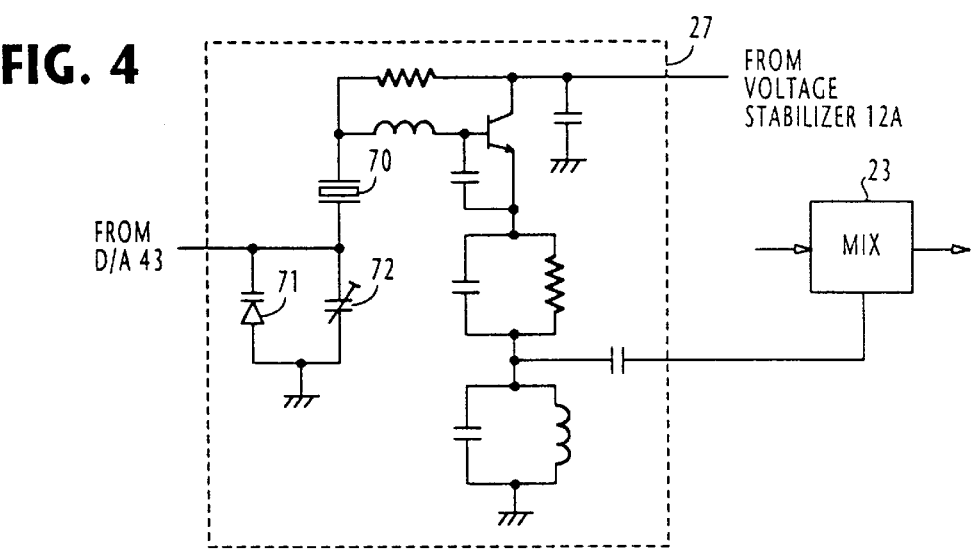
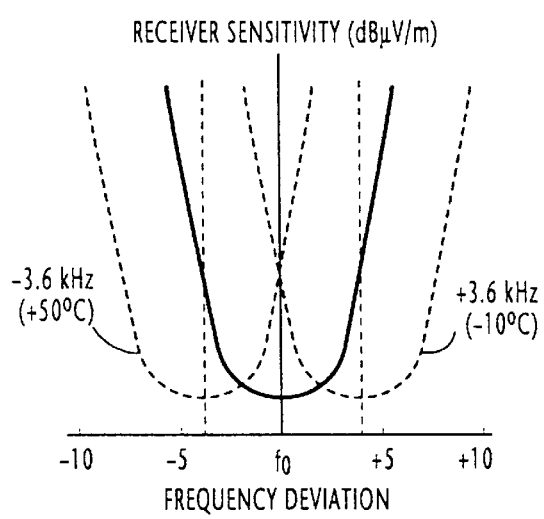
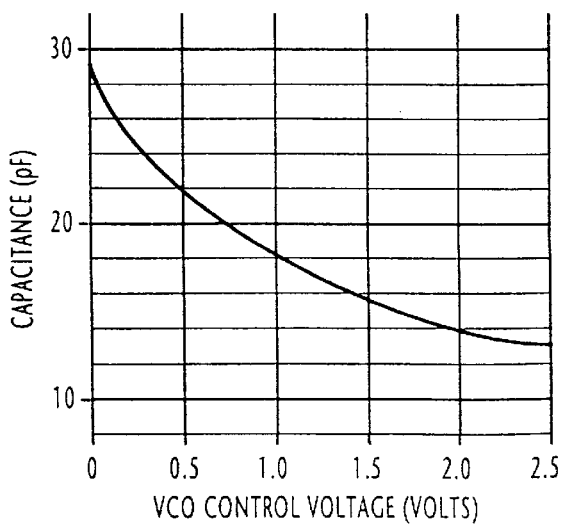

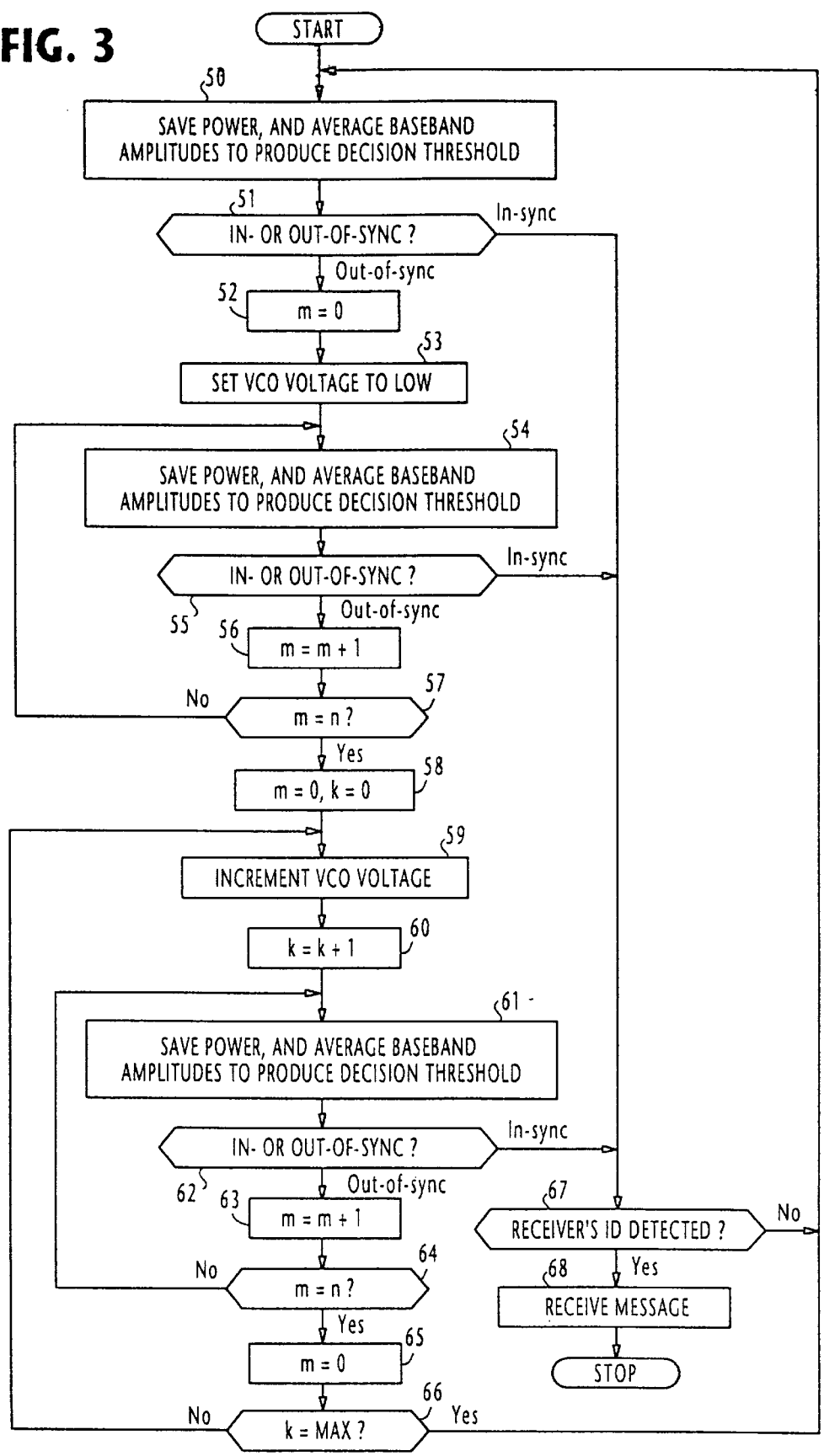

6,026,278

RADIO RECEIVER HAVING TEMPERATURE COMPENSATED VOLTAGE CONTROLLED CRYSTAL OSCILLATOR

BACKGROUND OF THE INVENTION

1. Field of the Invention

The present invention relates generally to radio receivers and more specifically to a receiver in which the temperature-dependent operating characteristic of a voltage-controlled crystal oscillator is compensated for by a frequency controller. The present invention is particularly suitable for portable radio receivers such as selective calling pagers where the power supply to the radio frequency circuitry is periodically interrupted for saving the consumption of the battery.

2. Description of the Related Art

Japanese Laid-Open Patent Specification Hei-2-218231 discloses a radio pager in which the local oscillator has a quartz crystal connected in series with a parallel circuit of a frequency trimming capacitor and a variable capacitance diode to produce a variable frequency local carrier. The local oscillator is energized by a voltage supplied from a voltage stabilizer. By using the temperature-dependent characteristic of the voltage stabilizer, the variable capacitance diode is controlled so that the temperature-dependent characteristic of the quartz crystal, and hence the local carrier frequency is compensated. However, if the receiver is subjected to a temperature variation in a range between −10° C. and +50° C., the operating characteristic of the quartz crystal goes outside the range of its manufacturing tolerances and the receiver would lose track of the transmitted carrier frequency. If the receiver were to be designed to operate under such severe conditions, the quartz crystal would have to meet a range of tolerances which are economically impractical.

SUMMARY OF THE INVENTION

It is therefore an object of the present invention to provide a simple and yet effective solution to the problem of temperature variations associated with the local oscillator of battery-saving radio receivers.

According to a first aspect of the present invention, there is provided a radio receiver having a radio-frequency section for receiving a transmitted radio signal containing a synchronization bit pattern, the radio-frequency section including a voltage-controlled crystal oscillator for producing a local carrier and a mixer for mixing the received radio signal with the local carrier, and a threshold decision circuit for comparing an output signal from the radio-frequency section with a decision threshold and producing a digital signal. A synchronization detector is provided for producing an in-sync signal when the synchronization bit pattern is present in the digital signal and an out-of-sync signal when the bit pattern is not present in the digital signal. A power saving circuit produces power saving pulses and periodically activates and deactivates the radio-frequency section with the power saving pulses. Frequency control circuitry varies a control voltage applied to the voltage-controlled crystal oscillator if a predetermined number of the power saving pulses is produced after the instant the out-of-sync signal is produced, repeatedly varies the control voltage by the predetermined amount if the predetermined number of the power saving pulses is produced again in the presence of the out-of-sync signal after the instant the control voltage was varied previously, and maintains the voltage at a level obtained at the instant the in-sync signal is produced.

According to a second aspect, the present invention provides a method for controlling a voltage-controlled crystal oscillator of a radio-frequency section of a receiver where the output of the oscillator is mixed with a received radio-frequency signal. The method comprises periodically interrupting the power supply of the radio-frequency section, and comparing an output signal of the radio-frequency section with a decision threshold and producing a digital signal during periods the radio-frequency section is energized. An in-sync signal is produced if the synchronization bit pattern is present in the digital signal and an out-of-sync signal is produced if the bit pattern is not present in the digital signal. If the out-of-sync signal is produced, power saving pulses are produced and the radio-frequency section are periodically deactivated in response to the power saving pulses. The frequency of the power saving pulses is then divided and a control voltage applied to the voltage-controlled crystal oscillator is varied by a predetermined amount in response to the frequency-divided power saving pulses and the control voltage applied to the oscillator is maintained at a level obtained at the instant the in-sync signal is produced.

According to a third aspect, the present invention provides a method for controlling a voltage-controlled crystal oscillator of a radio-frequency section of a receiver where the output of the oscillator is mixed with a received radio-frequency signal. The method comprises the steps of briefly interrupting the power supply of the radio-frequency section, comparing the output signal of the radio-frequency section with a decision threshold and producing a digital signal, determining whether the synchronization bit pattern is present in the digital signal or not, and repeating the above steps if the bit pattern is determined to be not present in the digital signal. A control voltage applied to the voltage-controlled crystal oscillator is varied by a predetermined amount if the bit pattern is determined consecutively a predetermined number of times to be not present in the digital signal, and repeating the above steps until said bit pattern is determined to be present in said digital signal.

BRIEF DESCRIPTION OF THE DRAWINGS

The present invention will be described in further detail with reference to the accompanying drawings, in which:

FIG. 2 is a timing diagram of the paging receiver;

FIG. 3 is a flowchart of the operation of the pager;

FIG. 4 is a circuit diagram of the voltage-controlled crystal oscillator of FIG. 1;

FIG. 5 is a graphic representation of a receiver sensitivity as a function of frequency deviation from the transmitted carrier frequency; and FIG. 6 is a graphic representation of a voltage-versus-capacitance relationship exhibited by a variable capacitance diode used in the voltage-controlled crystal oscillator.

DETAILED DESCRIPTION

Figure 1:
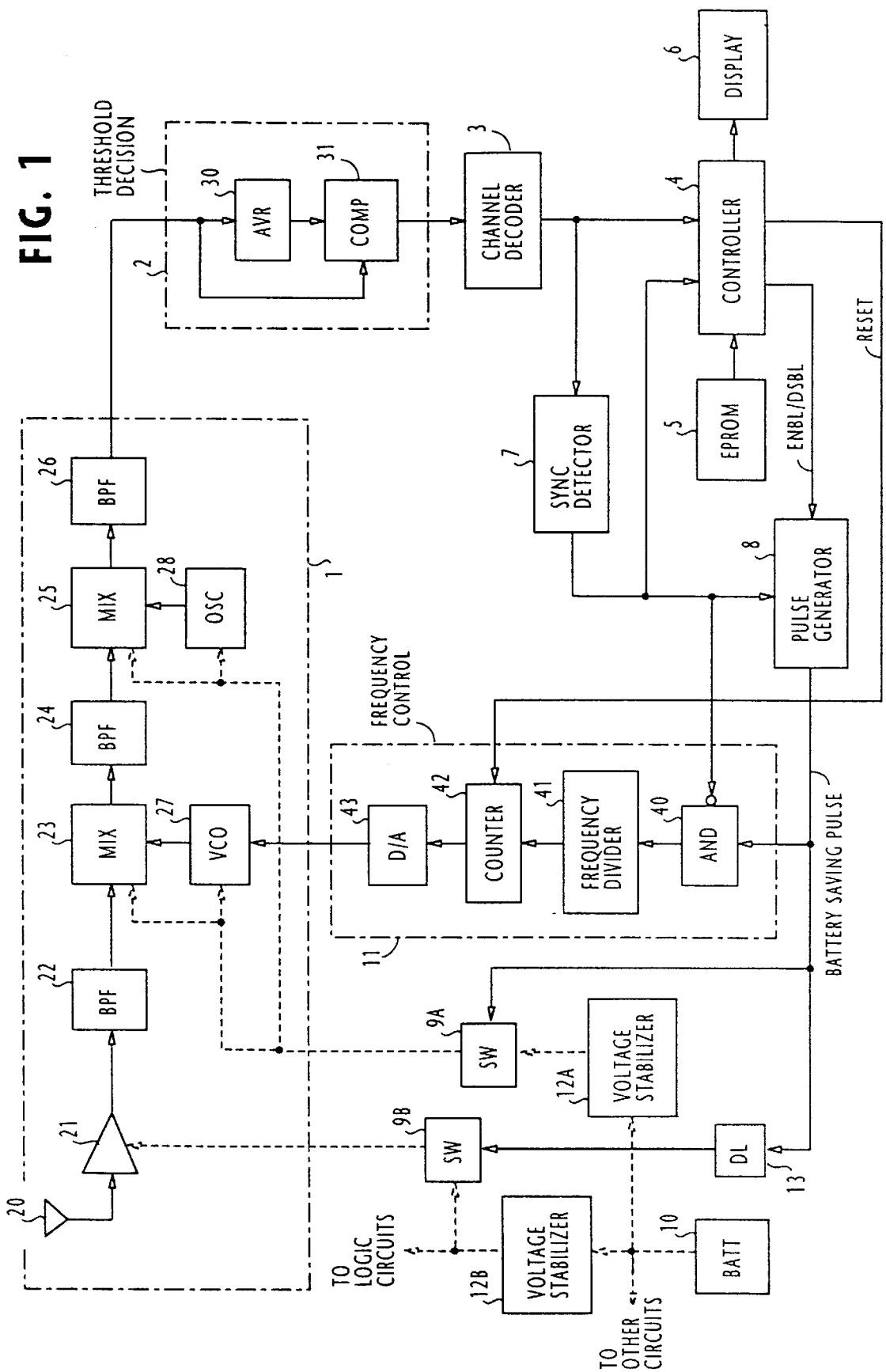
FIG. 1 is a block diagram of a selective calling radio pager according to the present invention.

Referring to FIG. 1, there is shown a selective calling radio pager of the present invention. The pager comprises a radio-frequency section 1, or superheterodyne frequency converter. Transmitted paging signal is received at antenna 20, amplified in a high-frequency amplifier 21, and band-limited through a filter 22 and applied to a mixer 23 where it is mixed with a local carrier from a voltage-controlled crystal oscillator 27, the output of mixer 23 being fed to a bandpass filter 24 to produce an intermediate frequency signal. The IF signal is converted to baseband frequency by a circuit formed by a mixer 25, a local oscillator 28 and a bandpass filter 26. The transmitted signal is in a sequence of frames each containing a synchronization bit pattern and receivers' identifying codes.

The baseband signal from the radio-frequency section is an analog signal which is applied to a threshold decision circuit 2 comprising an average circuit 30 and a comparator 31. The analog baseband signal is compared in comparator 31 with a decision threshold level which is derived by average circuit 30 as an average value of varying amplitudes of the baseband signal. Comparator 31 determines whether the analog baseband signal is higher or lower than the threshold level, and depending on this decision, produces an output having a sharply-defined amplitude as a digital baseband signal. If the modulation-demodulation scheme of the system involves binary signals, only one threshold is used for the threshold decision. If a multilevel coding scheme is used, more than one threshold level will be produced by the average circuit for comparison with an analog multilevel baseband signal.

The output of the threshold decision circuit 2 is a channel-coded signal (such as BCH-coded signal) from which the original digital signal is recovered by a channel decoder 3 and applied to a controller 4 which may be implemented with a CPU of the type Z80 manufactured by Zilog Inc. Controller 4 compares the input signal with the receiver's identifying code stored in an EPROM (electrically programmable read-only memory) 5. If they match, controller 4 activates an alarm, not shown, to alert the user of the arrival of a message and supplies the message to a display unit 6.

A sync detector 7 is connected to the output of channel decoder 3 to detect a synchronization bit pattern contained in the transmitted signal. If the local frequency of the VCO 27 is synchronized to the transmitted frequency, the sync detector 7 will detect a sync bit pattern in the digital baseband signal and produces a high-level signal. If the receiver loses synchronization, the sync detector 7 will produce a low-level signal.

For the purpose of saving the battery 10, a variable-rate pulse generator 8 is provided, which is usually enabled by the controller 4 to produce battery saving pulses (FIG. 2).

A voltage stabilizer 12A is connected to a battery 10 to raise the battery voltage (usually 1.4 volts) to a stabilized voltage of 3 volts, for example, and supplies it to the oscillators 27, 28 and mixers 23, 25 via switch 9A which is controlled by the power saving pulses. A voltage stabilizer 12B is also provided, which is connected to the battery 10 to supply a stabilized voltage to logic circuits of the receiver and to the power consuming devices of the receiver such as amplifier 21 via switch 9B. To allow the oscillators 27, 28 to be activated earlier than the high-frequency amplifier 21, a delay element 13 is provided for introducing a delay to the power saving pulse before being applied to the switch 9B. The battery 10 is also directly connected to the other circuits of the receiver where precision voltage stability is not required. When the battery saving pulse is high, switches 9A and 9B are turned on to activate the power consuming devices and when it is low, the switches 9A, 9B are turned off to interrupt their power supply. The use of a separate voltage stabilizer for the oscillators is to isolate them from noise produced by radio-frequency circuitry.

When the output of sync detector 7 is at high level, i.e., the receiver is in synchronization with the transmitter, pulse generator 8 defines a longer power saving cycle $T_0$ and activates the receiver's power-consuming unit for a shorter period of the cycle to allow the controller 4 to examine a portion of a frame in which identifying codes are inserted and deactivates it for a longer period of the cycle for saving the battery. If the receiver's identifying code is detected in a received frame, the pulse generator 8 is disabled by the controller 4 and the receiver is continuously energized to receive a message.

When the output of sync detector 7 goes low, i.e., the receiver is out of sync with the transmitter, pulse generator 8 defines a shorter battery saving cycle $T_1$ and activates the receiver's power-consuming unit for a first period of the cycle to allow sync detector 7 to search for a sync bit pattern and then deactivates it for the remaining period of the cycle.

According to the present invention, the voltage-controlled crystal oscillator 27 is controlled by a frequency controller 11, which comprises an AND gate 40, a frequency divider 41, a binary counter 42 and a digital-to-analog converter 43.

When the receiver loses synchronization with a result that sync detector 7 produces a low-level output, AND gate 40 is enabled to pass the battery saving pulses to the frequency divider 41 where their frequency is divided so that the output of divider 41 occurs once for each sequence of "n" consecutive $T_1$-battery saving cycles as shown in FIG. 2. Counter 42 is incremented by one in response to each output pulse of frequency divider and automatically resets itself to zero when it attains a maximum count value "k". The output of counter 42 is converted by the D/A converter 43 to a corresponding voltage. Thus, D/A converter 43 produces a discretely increasing voltage as counter 42 is successively incremented. Controller 4 is further supplied with the output of sync detector 7 to reset the counter 42 to zero when the receiver initially loses synchronization.

The operation of the receiver will be fully understood with reference to the flowchart of FIG. 3.

In FIG. 3, when the receiver interrupts the power of its radio-frequency section 1 and then activates it, the threshold decision circuit 2 averages the amplitudes of a received baseband signal to produce a decision threshold (step 50). Sync detector 7 checks to see if a sync bit pattern is detected in the received signal (step 51). If a sync bit pattern is detected, the receiver proceeds to step 67 to determine whether the receiver's identifying code (ID) is detected. If not, the receiver returns to the starting point of the operation. If the receiver's identifier is detected, the receiver proceeds to step 68 to receive and display a message.

If no sync bit pattern is detected at step 51, the receiver recognizes that it is in an out-of-sync state and proceeds to step 52 where a power saving count value "m" is set equal to zero, and the voltage supplied to the VCO 27 is set equal to a predetermined low voltage (step 53). Power saving is briefly performed and decision threshold is then determined after the power is turned on (step 54) and sync bit pattern detection is performed again (step 55). If the sync bit pattern is still not detected, the saving count value "m" is incremented by 1 (step 56) and checked to see if it is equal to an integer "n". If m≠n (step 57), the receiver repeats steps 54 to 56. As a result, power saving will be performed a maximum of "n" times if the VCO voltage is held at the predetermined low voltage. If m=n (step 57), the receiver resets the saving count value to 0 and sets a variable "k" to 0 (step 58) and increments the VCO voltage by a predetermined amount (step 59). The variable "k" is then incremented by 1 (step 60) and power saving is briefly performed and decision threshold is then determined (step 61) and sync bit pattern detection is performed (step 62). If the receiver is still out of sync with the transmitter (step 62), the saving count value is incremented by 1 (step 63) and its value is checked against the integer "n" (step 64). If m≠n (step 64), the receiver repeats steps 61 to 63, so that power saving will be performed a maximum of "n" times if the VCO voltage is held at the level set at step 59. If m =n (step 64), the receiver resets the saving count value to 0 (step 65) and checks to see if the k-value equals a maximum value (step 66). If the decision at step 66 is negative, the receiver returns to step to further increment the VCO voltage by a predetermined amount and increments the k-value (step 60) and repeats steps 61 to 64. Thus, power saving will be performed a maximum of "n" times if the VCO is biased at the further incremented voltage. In this way, the VCO control voltage will be incremented a maximum of "k" times. When this occurs, the receiver returns to step 50 to repeat the process all over again. If an in-sync condition is detected at steps 55 and 62 as at step 51, the receiver proceeds to identifier detection step 67.

Therefore, as long as an out-of-sync condition continues for a particular VCO control voltage, a sequence of power interruption, threshold decision determination and sync pattern search is repeated a maximum of "n" times, and the VCO control voltage is discretely varied if the sync pattern search fails to detect a sync bit pattern.

If the operating characteristic of the quartz crystal of VCO 27 has changed significantly as a result of an ambient temperature variation, the local carrier frequency will deviate from the transmitted carrier frequency, causing the receiver to lose synchronization with the transmitter. However, the present invention allows the receiver to re-synchronize to the transmitter by discretely sweeping the local carrier frequency while retaining the battery saving feature of the receiver.

A typical example of the voltage-controlled crystal oscillator 27 is shown in FIG. 4. Oscillator 27 includes a quartz crystal 70 connected to a parallel circuit of variable capacitance diode 71 and a trimmer capacitor 72. If the VCO frequency is 900-MHz and if the receiver experiences a temperature variation in the range between −10° C. and +50° C., the quartz crystal 70 will vary its operating characteristic in the manufacturing tolerance range of ±4 ppm (parts per million) from the normal temperature of 25° C. Hence, the local carrier will suffer a frequency variation in the range between +3.6 kHz and −3.6 kHz. It is seen from FIG. 5 that the frequency variation of +3.6 kHz causes a significant amount of deterioration in the receiver sensitivity. In a practical aspect, the voltage impressed on the variable capacitance diode 71 is incremented at a unit of 0.5 volts. If this VCO control voltage is set equal to 1.0 volt at the instant the receiver loses synchronization, the voltage increases to 1.5 volts and makes a search for the transmitter frequency during "n" battery saving cycles. If the receiver is still in the out-of-sync state, the voltage increases to 2.0 volts and continues the search. If the receiver fails to resynchronize, the voltage drops to 1.0 volt again to begin a new sequence of frequency search. Corresponding to the voltage variations of 1.0, 1.5 and 2.0 volts, the variable capacitance diode 71 will assume capacitance values of about 18, 16 and 14 picofarads, respectively, as illustrated in FIG. 6.

What is claimed is:
1. A radio receiver comprising:
   a radio-frequency section which receives a transmitted radio signal containing a synchronization bit pattern, said radio-frequency section including a voltage-controlled crystal oscillator for producing a local carrier and a mixer for mixing the received radio signal with said local carrier;
   a threshold decision circuit which compares an output signal of said radio-frequency section with a decision threshold and which produces therefrom a digital signal;
   synchronization detector means for producing an in-sync signal when said synchronization bit pattern is present in said digital signal and an out-of-sync signal when said bit pattern is not present in said digital signal;
   power saving means for producing power saving pulses and periodically activating and deactivating said radio-frequency section with said power saving pulses; and
   frequency control means for varying a control voltage applied to said voltage-controlled crystal oscillator by a predetermined amount if a predetermined number of said power saving pulses is produced after the instant said out-of-sync signal is produced, repeatedly varying said control voltage by said predetermined amount if said predetermined number of said power saving pulses is again produced in the presence of said out-of-sync signal after the instant said control voltage was varied previously, and maintaining the control voltage at a level obtained at the instant said in-sync signal is produced.

2. A radio receiver as claimed in claim 1, wherein said frequency control means comprises:
   a frequency divider for dividing the frequency of said power saving pulses;
   a binary counter for counting an output signal of said frequency divider; and
   a digital-to-analog converter for converting an output signal of the binary counter to a voltage signal and supplying the voltage signal to said voltage-controlled crystal oscillator as the discretely varied voltage.

3. A radio receiver as claimed in claim 1, wherein said threshold decision circuit comprises means for producing a decision threshold and a comparator for comparing said output signal of the radio-frequency section to produce said digital signal depending on an amplitude of said output signal relative to said decision threshold.

4. A radio receiver as claimed in claim 3, wherein said means for producing a decision threshold comprises an average circuit.

5. A radio receiver as claimed in claim 1, wherein said output signal is an analog baseband signal.

6. A radio receiver as claimed in claim 5, further comprising:
   means for recovering from said analog baseband signal a digital signal corresponding to information within the transmitted radio signal.

7. A radio receiver as claimed in claim 6, wherein said digital signal is a BCH code.

8. A radio receiver as claimed in claim 1, wherein said power saving means further comprises a first voltage stabilizer connected to a battery, said battery having a voltage, said first voltage stabilizer for raising said voltage of said battery to a first stabilized voltage.

9. A radio receiver as claimed in claim 8, wherein said first stabilized voltage is supplied by said first voltage stabilizer to said voltage-controlled crystal oscillator and said mixer.

10. A radio receiver as claimed in claim 1, further comprising a logic circuit, wherein:
   said radio-frequency section further comprises a power consuming device; and
   said power saving means further comprises a second voltage stabilizer connected to a battery, said battery having a voltage, said second voltage stabilizer for raising said voltage of said battery to a second stabilized voltage, said second stabilized voltage supplied by said second voltage stabilizer to said logic circuit and said power consuming device.

11. A radio receiver as claimed in claim 10, wherein said power consuming device comprises an amplifier.

12. A radio receiver as claimed in claim 1, wherein said power saving means further comprises a delay element for introducing a delay to said power saving pulses.

13. In a radio receiver comprising a radio-frequency section including a voltage-controlled crystal oscillator for producing a local carrier and a mixer for mixing a radio signal with said local carrier, a method comprising the steps of:

a) periodically interrupting power of said radio-frequency section;

b) comparing an output signal of said radio-frequency section with a decision threshold during periods said radio-frequency section is energized and producing therefrom a digital signal;

c) producing an in-sync signal when said synchronization bit pattern is present in said digital signal and an out-of-sync signal when said bit pattern is not present in said digital signal;

d) if said out-of-sync signal is produced, producing power saving pulses and periodically deactivating said radio-frequency section in response to the power saving pulses;

e) dividing the frequency of said power saving pulses; and f) discretely varying a voltage applied to said voltage-controlled crystal oscillator in response to the frequency-divided power saving pulses and maintaining the voltage at a level obtained at the instant said in-sync signal is produced.

14. The method of claim 13, wherein the step (b) comprises the steps of:

producing said decision threshold; and comparing the output signal of said radio-frequency section with said decision threshold to produce said digital signal depending on an amplitude of said output signal relative to said decision threshold.

15. In a radio receiver comprising a radio-frequency section (1) including a voltage-controlled crystal oscillator for producing a local carrier and a mixer for mixing a radio signal with said local carrier, a method comprising the steps of:

a) briefly interrupting power of said radio-frequency section;

b) comparing an output signal of said radio-frequency section with a decision threshold and producing therefrom a digital signal;

c) determining whether said synchronization bit pattern is present in said digital signal or not;

d) repeating steps (a) to (c) if said bit pattern is determined to be not present in said digital signal;

e) varying a voltage applied to said voltage-controlled crystal oscillator by a predetermined amount if said bit pattern is consecutively determined a predetermined number of times to be not present in said digital signal; and f) repeating steps (a) to (e) until said bit pattern is determined to be present in said digital signal.

16. The method of claim 15, wherein step (b) comprises the steps of:

producing said decision threshold; and comparing the output signal of said radio-frequency section with said decision threshold to produce said digital signal depending on an amplitude of said output signal relative to said decision threshold.

\* \* \* \* \*